UNITED STATES PATENT OFFICE.

EDUARD ULLRICH, OF HÖCHST-ON-THE-MAIN, GERMANY, ASSIGNOR TO THE FARBWERKE, VORMALS MEISTER, LUCIUS & BRÜNING, OF SAME PLACE.

NITROSOPHENYL-BLUE DYE-STUFF.

SPECIFICATION forming part of Letters Patent No. 364,320, dated June 7, 1887.

Application filed February 21, 1887. Serial No. 228,365. (No specimens.)

*To all whom it may concern:*

Be it known that I, EDUARD ULLRICH, doctor of philosophy, a citizen of the Empire of Germany, residing at Höchst-on-the-Main, in the Empire of Germany, have invented certain new and useful Improvements in Blue Coloring-Matter from Paranitroso-Phenyltolylamine; and I do hereby declare the following to be a full, clear, and exact description of the invention, such as will enable others skilled in the art to which it appertains to make and use the same.

This invention relates to the manufacture of blue coloring-matter or dye-stuff by the action of paranitroso-phenyltolylamine on phenols or oxycarbonic acids.

In carrying out my invention I proceed as follows: The paranitroso-phenyltolylamine, $NH\diagdown_{C_7H_7}^{C_6H_4-NO}$, is prepared from phenyltolyl-nitrosamine, $N-\diagdown_{NO}^{C_6H_5}_{C_7H_7}$, by treatment of the same with alcoholic hydrochloric acid. To five parts of the chlorhydrate of paranitrosophenyltolylamine and eight parts of gallic acid are added fifty parts of acetic acid (of twenty per cent.) and heated on a water-bath until the mass has taken a blue color. Now the product is poured into cold water, the blue coloring-matter, which has separated, filtered off, and washed with water.

The coloring-matter is in form of a dark-blue paste. It is insoluble in cold water and difficultly soluble in hot water. In dyeing as well as in printing, it is fixed on the fiber by means of chrome or iron mordants under addition of acetate of lime. It dyes a greenish-blue shade, whereas the coloring-matter obtained from paranitroso-diphenylamine, which is the subject of a former application for Letters Patent, dyes a more reddish-blue shade.

What I claim as new, and desire to secure by Letters Patent, is—

As a new manufacture, the blue coloring-matter or dye-stuff prepared by the action of paranitroso-phenyltolylamine upon phenols or oxycarbonic acids, as described, having the properties herein set forth.

In testimony whereof I affix my signature in presence of two witnesses.

EDUARD ULLRICH.

Witnesses:
ALVESTO S. HOGUE,
JEAN GRUND.